H. P. SPENCER.
CATTLE GUARD.
APPLICATION FILED APR. 23, 1914.

1,112,939.

Patented Oct. 6, 1914.

2 SHEETS—SHEET 1.

WITNESSES

INVENTOR
Henry P. Spencer
BY
ATTORNEYS

H. P. SPENCER.
CATTLE GUARD.
APPLICATION FILED APR. 23, 1914.

1,112,939.

Patented Oct. 6, 1914.
2 SHEETS—SHEET 2.

WITNESSES
A. E. Wade.
Alan F. Garner.

INVENTOR
Henry P. Spencer
BY Munn & Co.
ATTORNEYS

UNITED STATES PATENT OFFICE.

HENRY P. SPENCER, OF SHELBYVILLE, TENNESSEE, ASSIGNOR OF ONE-HALF TO EDGAR EARL SPENCER, OF BURNS, TENNESSEE.

CATTLE-GUARD.

1,112,939.  Specification of Letters Patent.  Patented Oct. 6, 1914.

Application filed April 23, 1914. Serial No. 833,956.

*To all whom it may concern:*

Be it known that I, HENRY P. SPENCER, a citizen of the United States, and a resident of Shelbyville, in the county of Bedford and State of Tennessee, have invented a new and useful Improvement in Cattle-Guards, of which the following is a specification.

This invention relates to cattle guards for preventing the movement of animals along a railway track, and more particularly to that class of guards including a vertically swinging gate actuable by a platform under the weight of cattle or other animals standing upon the platform.

One of the principal objects of the invention is to provide a cattle guard comprising a vertically movable gate, a platform connected by racks and pinions with the gate so that the latter will be operated upon the movement of a weight onto the platform.

A further object of the invention is to provide a device of the class described including a platform arranged entirely above the ties of the track, and consisting of a plurality of solid platforms arranged one between and one on each side of the rails, and so arranged with relation to each other and to the gate that upon pressure being applied on any one of the platforms the gate will be raised to present a barrier to the passage of animals over the track.

Another object of the invention is to provide a gate arranged above the ties and provided with barbs to present an effective barrier.

Still another object of the invention is to provide a device of the class described, which will be simple, durable, efficient in operation, inexpensive to manufacture, and one which may be applied to railway tracks at any point, without mutilation of the track or ties as is the common practice, which mutilation as a rule weakens the track at the point where the guard is situated.

With these and other objects in view which will become apparent as the description proceeds, the invention resides in the construction, combination and arrangement of parts herinafter more fully described and claimed and illustrated in the accompanying drawings, in which like characters of reference indicate like parts throughout the several figures, of which—

Figure 1:
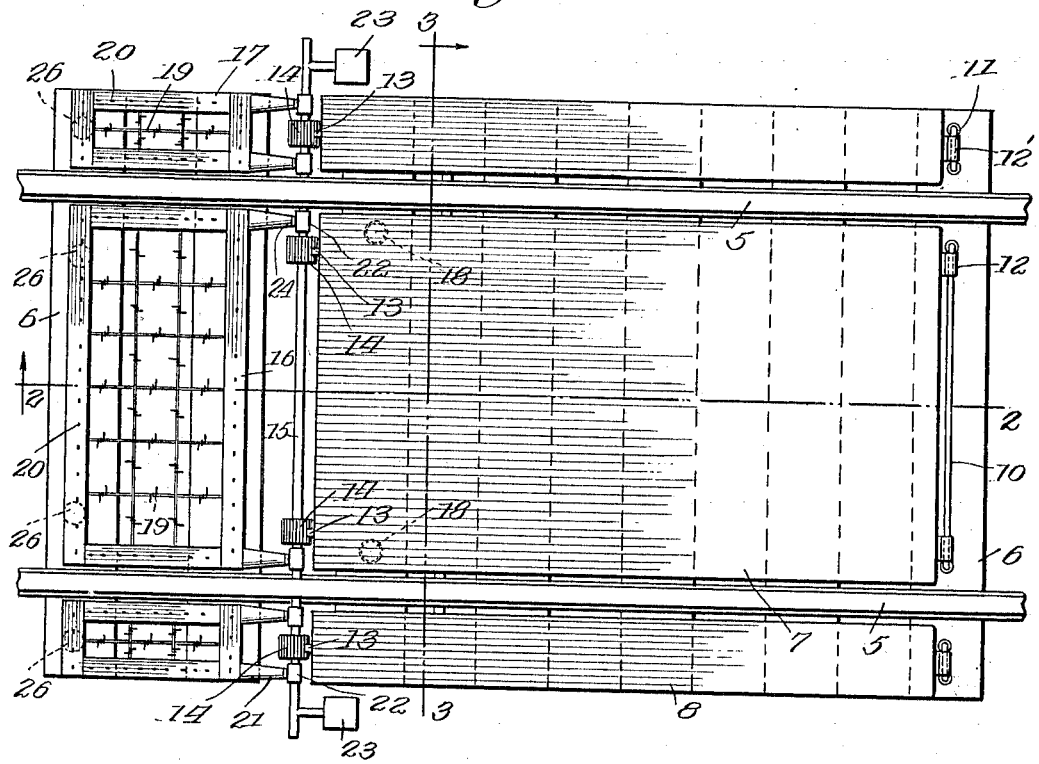
Figure 2:
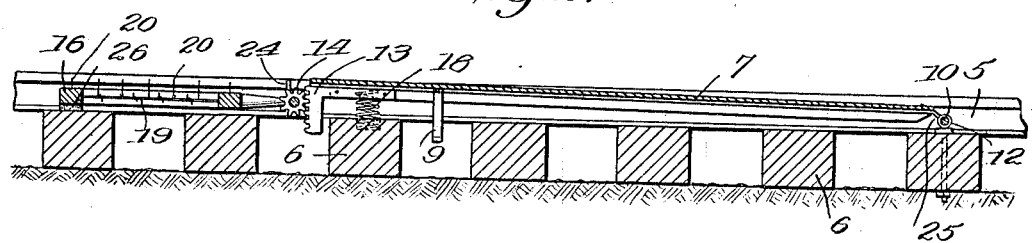
Figure 3:
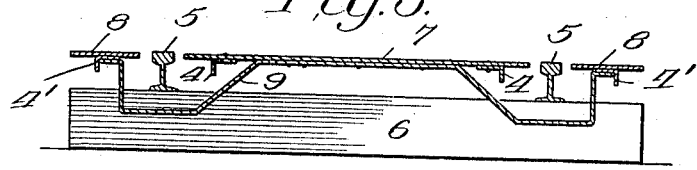
Figure 4:
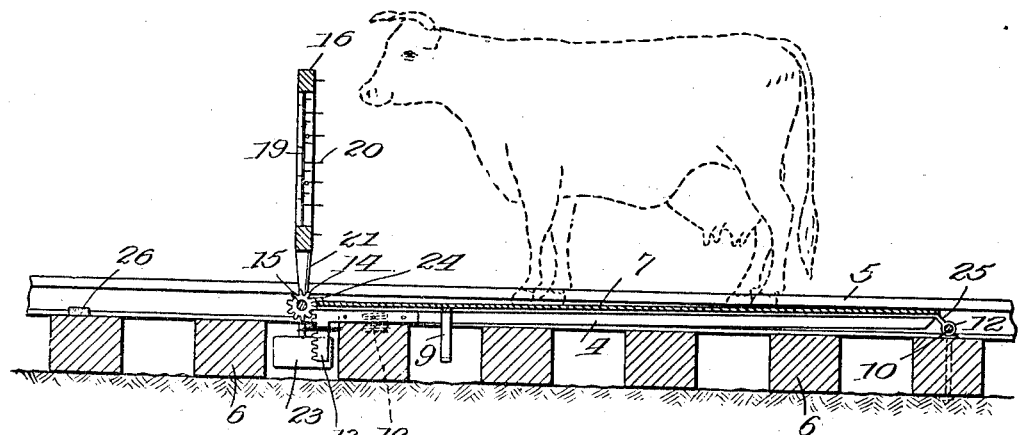
Figure 5:
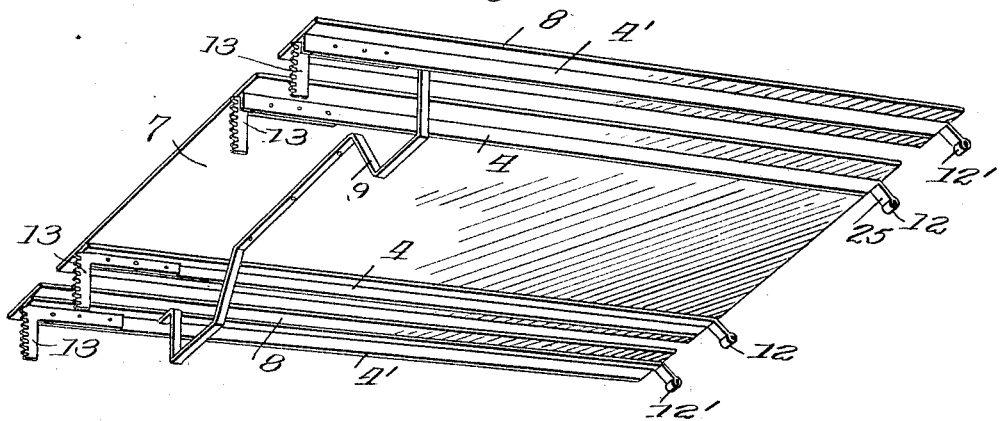
Figure 6:
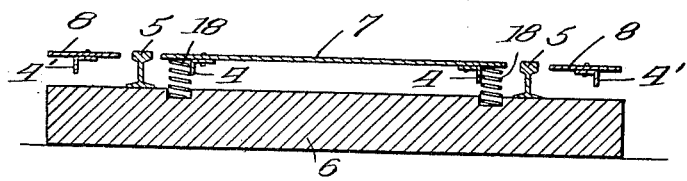

Figure 1, represents a plan view of the cattle guard constructed according to my invention, showing the same in position on a railroad track, Fig. 2, represents a vertical central longitudinal sectional view therethrough taken on the plane indicated by the line 2—2 of Fig. 1, and looking in the direction of the arrow, Fig. 3, represents a vertical transverse sectional view taken on the plane indicated by the line 3—3 of Fig. 1, and looking in the direction indicated by the arrow, Fig. 4, represents a view similar to Fig. 2, but showing the gate raised by reason of the occupancy of the platform by an animal, Fig. 5, represents a perspective view of the platform, and, Fig. 6, a view similar to Fig. 3, taken on a transverse plane in which the springs occur.

Referring more particularly to the drawings, 5 indicates the rails and 6 the cross ties of a track, and between the rails is positioned a central section 7 of a platform, whose outer sections 8 are disposed on either side of the rails of the track. The platform is disposed entirely above the cross ties, and the sections at one end are connected by a stout strap 9 which is secured at its central portion to the under face of the middle section 7, and at its ends is disposed so as to straddle the rails 5 in spaced relation thereto and beneath them, and is secured at its ends to the side sections 8 of the platform. The strap connects the sections of the platform near one end of the latter, and at the opposite ends the sections are pivotally connected to one of the cross ties on top of the same, by means of a pivot rod 10 to which the middle section is hinged, and pivot rods 11 to which the side sections of the platform are hinged, said rods 10 and 11 being secured to a single tie between and on opposite sides of the rails respectively, and the rods may be secured in any desirable manner to the ties. The middle section is provided with a pair of longitudinally disposed angle irons 4, running substantially the length of the section, in spaced and parallel relation to each other and to the edges of the sections, and said irons at their rear ends are formed into eyes 12 through which the pivot bar 10 passes whereby the middle section is hinged on said bar, and each of the side sections 8 is provided with central longitudinally disposed angle irons 4′, which irons at their rear ends are also formed into eyes 12′ for hinging the side sections to the pivot bars 11. Secured in any suitable manner to the forward end of each angle iron, are vertically disposed slightly arcuate rack bars 13, which are arranged in transverse alinement and with their upper ends substantially even with the platform, and which project downwardly a sufficient distance, and are disposed so that they may play in the space between adjacent cross ties.

The rack bars or toothed segments 13 are in mesh with pinions 14 keyed upon a revoluble shaft 15, to which is fixedly secured the barrier or gate comprising central and side sections 16 and 17 respectively, said gate normally occupying a horizontal position between and on each side of the rails, and adapted to be moved into vertical position upon the movement of an animal on to the platform thereby depressing the latter against the tension of coiled springs 18 and thus rotating shaft 15 through action of racks 13 and pinions 14. The springs 18 may be disposed at the forward end of the central section of the platform between said platform and one of the cross ties, and the springs at their lower ends may be seated in recesses cut in the top surface of the cross tie for keeping the springs in place. The gate sections each comprise a substantially rectangular frame which may be made of wood or other suitable material, and which is strung with barbed wire 19 and is provided around its edges with prongs 20 which project upwardly when the gate sections are in horizontal position and hence are disposed toward the platform when the gate is in vertical position, so that an effective barrier is provided to prevent passage of cattle, a barrier which will effectually prevent the cattle from pushing against the gate when it is in upright position, and one which will prevent the passage of smaller animals along the track which are of a weight insufficient to raise the gate, for the reason that the barbs and prongs project upwardly from the gate when the latter is in horizontal position.

The gate sections are connected to shaft 15 by means of arms 21 disposed one at each end of the gate sections adjacent the shaft, said arms provided with eyes 22 through which the shaft extends, and which are keyed or otherwise secured in fixed relation with the shaft, so that the gate will be rotated as the shaft is rotated. The shaft is shown as being rotatably positioned in the webs of rails 5, and this construction is a desirable one, although the shaft could be journaled in brackets (not shown) beneath the rails. Secured in any desirable manner at the opposite ends of the shaft 15 and on the opposite side thereof from the gate, are counterweights 23, for counter balancing the gate to allow movement of the same into raised position upon the movement of an animal of small weight on to the platform. In order to limit the movement of the gate after the same has attained a vertical position, arms 21 are provided near eyes 22 with stop arms or pins 24 adapted as shown in Fig. 5 when the gate is in vertical position, to engage the forward edge of the platform for limiting the movement of said gate, the platform in the meantime having practically reached the end of its downward movement by coming in contact with the cross tie adjacent shaft 15, the parts being so arranged that when the movement of the platform is limited by the tie, the gate will have assumed a vertical position and the stop pins will have come into engagement with the platform. The pins are of such length as not to project above the head of the rails when the gate is horizontal.

The rear ends of the angle irons secured to the sections of the platform, are bent slightly downwardly as at 25, as illustrated in Fig. 2, so that the eyes 12 and 12′ are disposed below the level of the platform, and the latter is hence disposed in spaced relation to the cross ties 6, and above the same, but slightly below or at least not above the tread of the rails 5, and the platform is normally held in raised position by action of the springs 18. If so desired, one of the cross ties may be provided with cushions 26 upon which may rest the outer rails of the gate frames, so that when the latter returns from vertical to horizontal position, the shock may be absorbed by the cushions so as to prevent unnecessary jarring of the gates and of the parts of the device, the strength of the springs, however, being only great enough to return the gate to its normal position upon removal of weight from the platform.

It will be noted that the device described is extremely simple in its character and construction, and that it may be applied at any point of a railway track, and does not require skilled labor in placing it on a track, nor special tools, nor does it require the removal of any of the cross ties or the special bracing of them, or the rails, nor any mutilation of the railway track, thus doing away with many of the undesirable features accruing to the guards of this type heretofore provided.

Although I have described the preferred embodiment of my invention, I may desire to make such changes in the construction, combination and arrangement of parts thereof, as do not depart from the spirit of the invention and the scope of the appended claims.

I claim:

1. A cattle guard comprising a central platform section disposed between the rails of a track, and wholly above the ties thereof and side sections disposed on opposite sides of the track rails and wholly above the ties, a strap secured to said central section and side sections and spanning the rails below the same, angle irons disposed in parallel relation longitudinally of and secured to the platform sections, said irons having eyes formed at one end thereof, pivot bars secured to one of the cross ties, on which said eyes are journaled, vertically disposed rack bars secured one to each of the angle irons, said rack bars at their upper edges being even with the plane of the platform, said bars disposed in horizontal alinement, a shaft journaled transversely of the track, a gate fixedly secured to said shaft, pinions carried by the shaft in mesh with said rack bars, counterweights carried by said shaft, coiled springs disposed between said platform and one of the cross ties, said springs normally holding said platform in raised position, said gate being disposed in horizontal relation when the platform is in raised position, and coöperating means between the platform and gate for limiting the movement of the latter.

2. A cattle guard including a gate comprising a central section disposed between rails of the track, and side sections disposed on opposite sides of the track rails, said sections each being formed of a substantially rectangular frame work, barbed wire strung on said sections, prongs secured on said sections, a shaft journaled transversely of the track rails, arms secured to said gate sections, and having eyes through which said shaft extends, said eyes being keyed on the shaft, said gate being disposed normally in horizontal position between and on each side of the track rails and wholly above the ties, an actuating platform, gear means between the platform and shaft for rotating the latter when the former is moved, for moving the gate into vertical position, and means carried by the arms for engaging said platform whereby to limit the movement of the gate.

3. A cattle guard comprising a platform pivoted at one end and free to move at the other end, said platform being disposed entirely above the ties of the track, a shaft journaled transversely of the track, co-acting means between the free end of the platform and the shaft for rotating the latter as the former is moved, a gate fixedly connected with the shaft and adapted to be moved from horizontal to vertical position as the latter is moved, and stop pins carried by the gate and adapted to engage the platform for limiting the movement of the gate.

HENRY P. SPENCER.

Witnesses:
 H. H. NELSON,
 E. B. WILLIAMS.

Copies of this patent may be obtained for five cents each, by addressing the "Commissioner of Patents, Washington, D. C."